US009561861B2

(12) United States Patent
Wavering et al.

(10) Patent No.: US 9,561,861 B2
(45) Date of Patent: Feb. 7, 2017

(54) POWER-DISTRIBUTION SYSTEM PROVIDING COMPLETE SEPARABILITY BETWEEN A CIRCUIT BREAKER PANEL AND A CHASSIS

(71) Applicant: Hamilton Sundstrand Corporation, Charlotte, NC (US)

(72) Inventors: Jeffrey T. Wavering, Rockford, IL (US); Richard L. Downing, Loves Park, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 14/792,050

(22) Filed: Jul. 6, 2015

(65) Prior Publication Data

US 2017/0008638 A1 Jan. 12, 2017

(51) Int. Cl.
*B64D 41/00* (2006.01)
*H02B 1/21* (2006.01)

(52) U.S. Cl.
CPC .............. *B64D 41/00* (2013.01); *H02B 1/21* (2013.01); *B64D 2221/00* (2013.01)

(58) Field of Classification Search
CPC ........ B64D 41/00; B64D 2221/00; H02B 1/21
See application file for complete search history.

(56) References Cited

U.S. PATENT DOCUMENTS

| 8,094,436 | B2* | 1/2012 | Mills | ............... | H02B 1/056 |
| | | | | | 361/634 |
| 8,488,302 | B2* | 7/2013 | Mills | ............... | H02B 1/04 |
| | | | | | 361/622 |
| 8,649,160 | B2* | 2/2014 | Mills | ............... | H02B 1/056 |
| | | | | | 174/59 |
| 9,197,040 | B2* | 11/2015 | Mills | ............... | H02B 1/056 |
| 9,270,090 | B2* | 2/2016 | Mills | ............... | H02B 1/04 |
| 2012/0262848 | A1 | 10/2012 | Mills et al. | | |
| 2014/0111345 | A1* | 4/2014 | Mills | ............... | H02B 1/044 |
| | | | | | 340/638 |
| 2014/0185194 | A1 | 7/2014 | Mills et al. | | |
| 2015/0194794 | A1* | 7/2015 | Mills | ............... | H02B 1/056 |
| | | | | | 361/624 |

OTHER PUBLICATIONS

Extended European Search Report, for European Patent Application No. 16178009.3, dated Nov. 3, 2016, 7 pages.

* cited by examiner

*Primary Examiner* — Robert J Hoffberg
(74) *Attorney, Agent, or Firm* — Kinney & Lange, P.A.

(57) ABSTRACT

A power-distribution panel has a circuit-breaker panel that is completely separable from an aircraft and from a back chassis connected to the aircraft. The back chassis is mechanically mounted to the aircraft and electrically connected to both a power-supply bus and a power-distribution harness of the aircraft. The circuit-breaker panel can be removably coupled to the back chassis to complete a plurality of circuits from the power supply bus to a plurality the plurality of circuits that receive power via the power-distribution harness. In some embodiments, the circuit-breaker panel can be slideably coupled to the back chassis without the use of tools. Electrical connectors may provide electrically connectivity between the circuit-breaker panel and the back chassis. The electrical connectors may have back chassis portions that align with circuit-breaker panel portions so as to provide such electrically connectivity automatically when the circuit-breaker panel is coupled to the back chassis.

20 Claims, 9 Drawing Sheets

POWER-DISTRIBUTION SYSTEM PROVIDING COMPLETE SEPARABILITY BETWEEN A CIRCUIT BREAKER PANEL AND A CHASSIS

BACKGROUND

Modern aircraft have various electrical systems that require different types of power. Some loads might require 28 VDC power like the cabins of the aircraft for general lighting systems. The low voltage DC power might also be used for aircrafts display monitors in the cockpit for presenting fight information while some may be used for providing power to entertainment displays during flight. In addition to the low voltage 28 VDC system loads will be loads that require large power such as galleys and these would be powered by 115 VAC power. Another AC 115 V load might be a backup electric fuel pump used in case a gear driven fuel pump fails. Many of these systems on today's aircraft are electrically controlled and therefore required electrical operating power.

Some of the electrical system loads on an aircraft are deemed essential, while other electrical system loads might be deemed non-essential. Examples of essential system loads are the systems that are employed to keep a plane flying in a controlled manner. Some of the electrical system loads, such as, perhaps, an entertainment system, might be considered non-essential. Essential system loads are generally electrically separated from non-essential system loads so that if the power supplied by an aircraft's generator is limited, such power can be directed to essential system loads first. Electrical system loads are also separated to prevent a common mode or same failure type cannot disable both the essential and non-essential system loads with a single electrical fault. To address these needs, aircrafts have power-distribution systems for controlling the supply of power to the various circuits and systems requiring electrical power.

Aircraft electric power distribution systems are generally segregated into three channels of electric supply power for redundancy and safety. The two main channels of electric power are segregated right and left on the aircraft and an emergency electric power channel is further isolated as a final source of power in an emergency. A typical main channel of an aircraft electric power system will consist of an AC 115 VAC distribution panel and a 28 VDC distribution panel. Each of these panels control, protect and distribute the electric power to the aircraft.

SUMMARY

Apparatus and associated methods relate to a power-distribution panel including a front circuit-breaker panel having a plurality of circuit breakers. The power-distribution panel includes a back chassis having an aircraft interface for mechanically coupling to an aircraft and for electrically coupling to both a power-supply bus and to a power-distribution harness of an aircraft. The back chassis also has a front panel interface configured to receive and secure to the front circuit-breaker panel. The front circuit-breaker panel and the back chassis are configured to be secured together such that each of the plurality of circuit breakers is in electrical communication with the power-distribution harness in a first configuration state. The front circuit-breaker panel and the back chassis are configured to be separated from one another such that the front circuit-breaker panel is electrically isolated from the power-distribution harness and from the power-supply bus in a second configuration state.

In some embodiments, a power-distribution panel includes a back chassis configured to be mechanically mounted to an aircraft. The back chassis includes an aircraft interface configured to receive power from one or more power-supply lines, and to provide operating power to a plurality of power-distribution lines. The back chassis includes a front-panel interface configured to receive a front circuit-breaker panel. The front-panel interface has one or more supply-power connectors and a plurality of distribution-power connectors. The back chassis includes a plurality of primary high-current contactors configured to provide interruptible electrical communication of the operating power between the aircraft interface and the front-panel interface. The back chassis also includes a control interface to which a controller provides power-interruption control of the one or more primary high-current contactors based on sensed operating conditions.

The front circuit-breaker panel includes a back-chassis interface having one or more supply-power connectors configured to electrically engage the one or more supply-power connectors of the front-panel interface. The back-chassis interface has a plurality of distribution-power connectors configured to electrically engage the plurality of distribution-power connectors of the front-panel interface. The front chassis also includes a plurality of circuit breakers each having an input port electrically coupled to receive power supplied through the one or more supply-power connectors. Each of the plurality of circuit breakers has an output port electrically coupled to supply power through a distribution-power connector. The front circuit-breaker panel is configured to removably couple to the back chassis.

In some embodiments, a method of distributing power within an aircraft includes mechanically mounting a back chassis to an aircraft. The method includes removably coupling the front circuit-breaker panel to a back panel.

DETAILED DESCRIPTION

Figure 1:
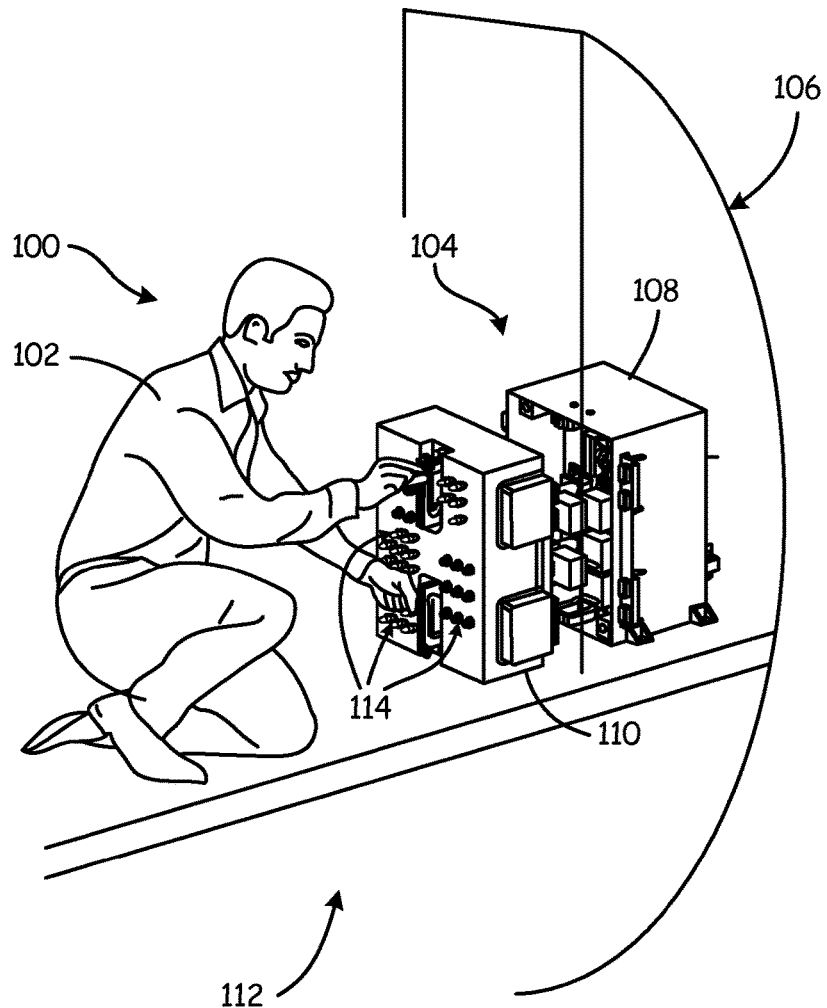
FIG. 1 is a perspective view of a maintenance worker removing a front circuit-breaker panel from a back chassis in an aircraft.

Apparatus and associated methods relate to a quick connect/disconnect system for a front circuit-breaker panel of an aircraft. The front circuit breaker panel is completely separable from a back chassis that is mounted to the aircraft. The back chassis provides electrical communication between a supply power bus of the aircraft and a front-panel interface to which the front circuit-breaker panel is connectable. The back chassis also provides electrical communication between a power-distribution harness of the aircraft and the front-panel interface. The back chassis can have one or more primary high-current contactors through which power from the supply power bus is provided to the front circuit-breaker panel, when connected to the back chassis. The back chassis can receive an external power controller signal that interruptably controls the conductivity of the primary high-current contactors based, at least in part, on sensed electrical conditions of the power supply bus.

The front circuit-breaker panel has a plurality of circuit breakers, through which power from the power supply bus is interruptably delivered to various electrical lines of the power-distribution harness. Each of the circuit breakers can be sized to open in response to a specific over-current condition. The front circuit breaker panel has a back-chassis interface that includes connectors aligned to complementary connectors of the back chassis. When the front circuit-breaker panel is coupled to the back chassis, each of the connectors of the front circuit-breaker panel is electrically coupled to its aligned complementary connector of the back chassis. Some of these connector/complementary connector pairs provide power from the supply power bus of the aircraft to one or more of the circuit breakers. Some of these connector/complementary connector pairs deliver power from a circuit breaker to an electrical wire of the power-distribution harness.

The front circuit-breaker panel has a mechanical alignment feature that aligns with a complementary alignment feature of the back chassis. The front circuit-breaker panel and/or back chassis has a locking mechanism that secures the front circuit-breaker panel to the back chassis when coupled together. To secure the front circuit-breaker panel to the back chassis the front circuit-breaker panel is aligned with the back chassis and then translated toward the back chassis so as to engage the mechanical alignment features to each other. The mechanical alignment features may permit translation in a coupling direction. The translation continues until the locking mechanism secures the front circuit-breaker panel to the back chassis. When so secured, the connectors are electrically coupled to the complementary connectors completing the circuits that are interruptably controlled by the circuit breakers. Thus, the connectors and complementary connectors are aligned consistently with the mechanical alignment features so that electrical coupling coincides with mechanical coupling. A coupling direction for the connectors relative to the complementary connectors is substantially that of the coupling direction associated with the mechanical alignment features.

Quick connect/disconnect systems can have one or more of the following advantages. In some embodiments, a quick connect/disconnect system can provide quick access to components of a power-distribution system. Internal compartments of the power-distribution system can be fully exposed upon complete separation of a front circuit-breaker panel from a back chassis. Such full exposure can facilitate the removal, adjustment, and/or repair of such exposed components. In some embodiments, the front circuit-breaker panel can be removed without the use of tools. Toolless removal of the front circuit-breaker panel can shorten maintenance time which can reduce maintenance costs. And full exposure of internal components can permit a permanent or semi-permanent mounting of the back chassis, as chassis removal would not be required for component maintenance. Such a permanent or semi-permanent mounting of the back chassis can eliminate a tray, which can be used as an intermediated between a back chassis and an aircraft. Elimination of a mounting tray can reduce size and weight of the power distribution system. Mounting tray elimination can facilitate efficient routing of power through the power distribution system, because power need not be routed to and/or through the mounting tray.

In this specification, an exemplary method of distributing power to aircraft circuits and/or systems will be shown. First, with reference to FIG. 1, an exemplary maintenance scenario will provide context for a quick connect/disconnect system for removing/attaching a front circuit-breaker panel to a back chassis of a power-distribution system of an aircraft. Then, with reference to FIGS. 2-8, an exemplary power-distribution system having such a quick connect/disconnect system for attachment and removal of a front circuit-breaker panel will be described. Finally, an exemplary power-distribution system having a separable front circuit-breaker panel from a back chassis will be described in the abstract, with reference to the FIG. 9 block diagram.

FIG. 1 is a perspective view of a maintenance worker removing a front circuit-breaker panel from a back chassis in an aircraft. FIG. 1 depicts maintenance scenario 100, in which maintenance worker 102 is working on power-distribution system 104 of aircraft 106. Power-distribution system 104 includes back chassis 108 and front circuit-breaker panel 110. Back chassis 108 is mechanically mounted to floor surface 112 of aircraft 106. Back chassis 108 is electrically coupled to a power-distribution harness of aircraft 106, so as to provide access to various power lines providing power to various electrical systems of aircraft 106. The various power lines may include power-supply lines and power-distribution lines, for example. The power-supply lines may conduct supply power from one or more electrical generators or electrical converters of aircraft 106. The power-distribution lines may carry power to various electrical circuits and/or systems of aircraft 106.

Operating power for each of the various electrical circuits can be supplied via a circuit breaker so that should one circuit have an overload condition (e.g., a short circuit), power to such an overloaded circuit can be interrupted without affecting the other circuits. In the depicted embodiment, the power supply and the distribution power accessed by back chassis 108 may be presented to front circuit-breaker panel 110 so that each circuit can be completed by electrically connecting one of a plurality of circuit breaker 114 therebetween. Such electrical connection may be made by electrical contacts on back chassis 108 that are aligned with electrical contacts on front circuit-breaker panel 110. Such aligned pairs of contacts may automatically make electrical connection with each other when front circuit-breaker panel 110 is coupled with back chassis 108.

When performing maintenance on power-distribution system 104, it can be advantageous to completely separate front circuit-breaker panel 110 from back chassis 108. Such complete separation can permit front circuit-breaker panel 110 to be worked on at a more spacious location than might be available at a location where back-chassis 108 is mechanically mounted to aircraft 106. Furthermore, by completely removing front circuit-breaker panel 110 from back chassis 108, a full compartment of back chassis 108 is exposed to maintenance worker 102. Components mounted within the exposed compartment may be more easily removed, adjusted, and/or repaired when so fully exposed.

Figure 2:
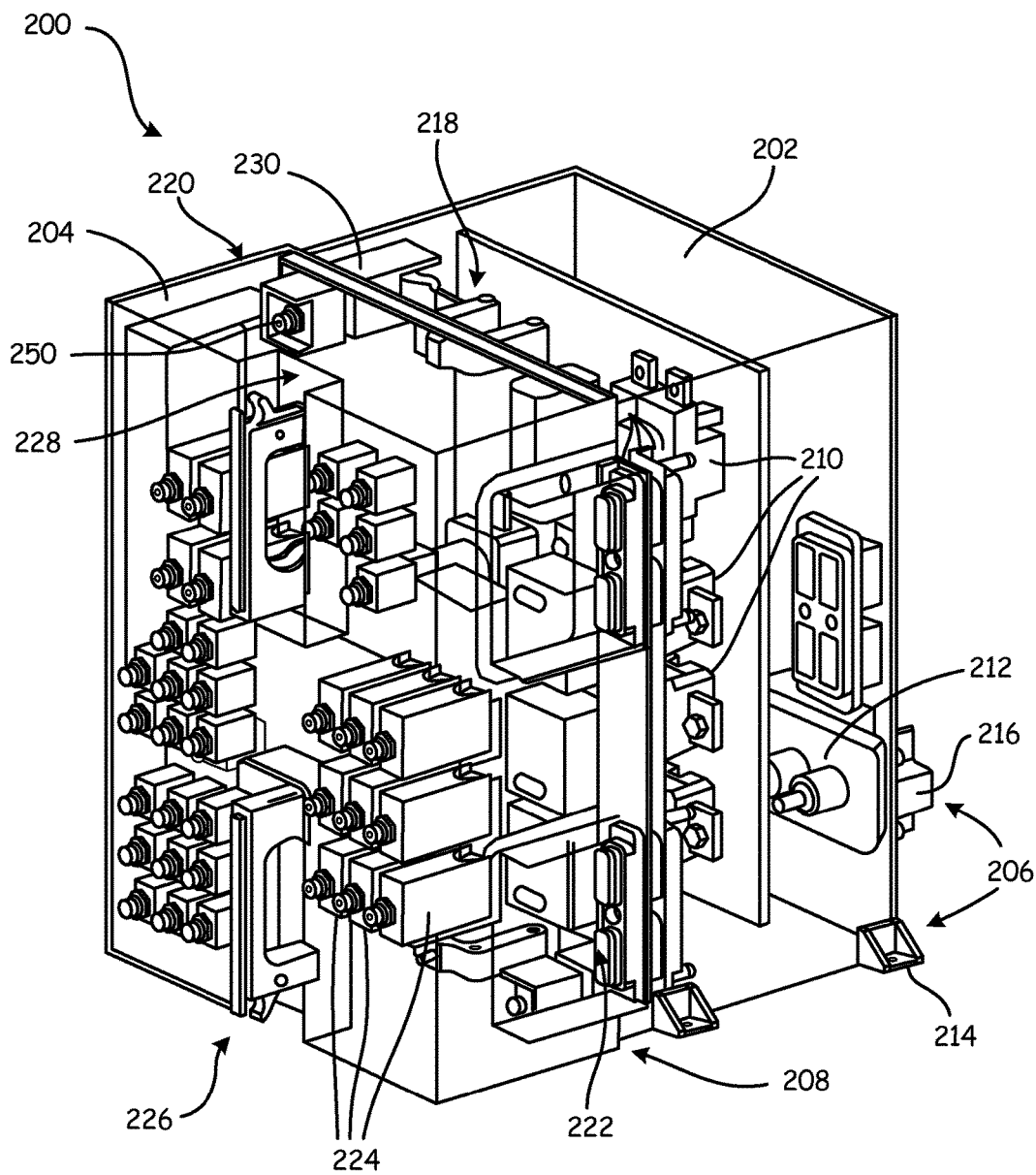
FIG. 2 is a front perspective view of an exemplary power-distribution system with a front circuit-breaker panel coupled to back chassis.

FIG. 2 is a front perspective view of an exemplary power-distribution system with a front circuit-breaker panel coupled to back chassis. In FIG. 2, exemplary power-distribution system 200 includes back chassis 202 and front circuit-breaker panel 204. Back chassis 202 includes aircraft interface 206 and front-panel interface 208. Back chassis 202 further includes primary high-current contactors 210 and power terminal block bus interface 212. Aircraft interface 206 includes mechanical aircraft interface 214 and electrical aircraft interface 216. Front-panel interface 208 includes mechanical panel interface 218 and electrical panel interface 220. Front circuit-breaker panel 204 has back-chassis interface 222, plurality of circuit breakers 224 and user interface 226. Back-chassis interface 222 includes mechanical chassis interface 228 and electrical chassis interface 230. Parts 200, 202, 204 and 224 could be used for parts 104, 108, 110 and 114 shown in FIG. 1, respectively.

In the FIG. 2 depiction, power-distribution system 200 is shown unmounted from an aircraft. Front circuit-breaker panel 204 is shown as being coupled to back chassis 202. When so coupled, front circuit-breaker panel 204 is both mechanically connected and electrically connected with back chassis 202. Front circuit-breaker panel 204 can be aligned to back chassis 202 and then translated to be received by the back chassis 202. During such a coupling operation of front circuit-breaker panel 204 to back chassis 202, electrical connections are automatically made between electrical panel interface 220 of back chassis 202 and electrical chassis interface 230 of front circuit-breaker panel 202. Thus, each of a plurality of circuits is electrically completed by the coupling operation described above.

Using electrical connectors as an electrical interface, such as electrical chassis interface 230 and electrical panel interface 220, to complete the plurality of circuits can facilitate a complete mechanical separation of front circuit-breaker panel 204 from back chassis 202. Such a complete mechanical separation might be difficult to perform if front circuit-breaker panel 204 is connected to back chassis 202 via a wired interface therebetween.

The ability to completely separate front circuit-breaker panel 204 from back chassis 202 may advantageously facilitate maintenance of power-distribution system 200. Because front circuit-breaker panel 204 can be completely separated from back chassis 202, components contained within an interior compartment of back chassis 202 can be fully exposed. Removal, adjustment, and/or replacement of such components may be facilitated by such a full exposure of the interior compartment. Because such components can be easily maintained with exposed access, the back chassis can be permanently or semi-permanently (e.g., requiring a plurality of fasteners to be unfastened using tools) mounted to an aircraft. When a back chassis is permanently mounted to an aircraft, a mounting tray or interface might not be required between the back chassis and the aircraft. Elimination of a mounting tray can save cabin space and aircraft weight.

Figure 3:
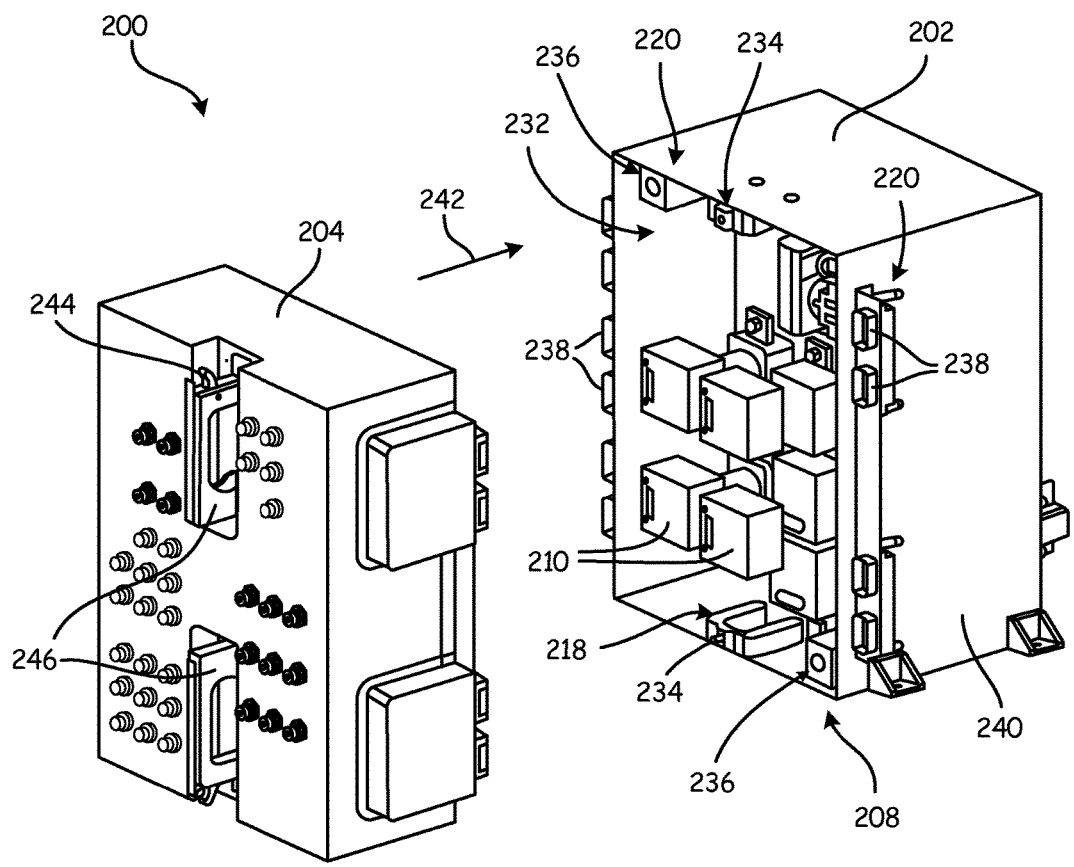
FIG. 3 is a front perspective view of an exemplary power-distribution system with a front circuit-breaker panel separated from a back chassis.

FIG. 3 is a front perspective view of an exemplary power-distribution system with a front circuit-breaker panel separated from a back chassis. Power-distribution system 200 is the same system depicted in FIG. 2, but with front circuit-breaker panel 204 separated from back chassis 202. In the FIG. 3 depiction, contents of interior compartment 232 of back chassis 202 are fully exposed. Intra-compartment wiring is not depicted so as not to obscure the depiction of components within interior compartment 232. Interior compartment 232 contains the plurality of primary high-current contactors 210 as well as power terminal block bus interfaces 212. With front circuit-breaker panel 204 removed from back chassis 202, front-panel interface 208 is also exposed. Front-panel interface 208 includes mechanical panel interface 218 and electrical panel interface 220. Mechanical panel interface 218 of the depicted embodiment includes a pair of alignment guide pins 234. Electrical panel interface 220 includes a pair of DC bus power pin receivers 236 and a plurality of distribution connectors 238 (FIG. 3). In the depicted embodiment, distribution connectors 238 are arranged on both lateral sides 240 of back chassis 202.

Translation direction vector 242 indicates a direction of translation of front circuit-breaker panel 204 that electrically and mechanically connects front circuit-breaker panel 204 to back chassis 202. Alignment guide pins 234 may be received within complementary guide-pin channels in mechanical chassis interface 228 of front circuit-breaker panel 204. Alignment guide pins 234 may constrain any relative movement between front circuit-breaker panel 204 and back chassis 202 to a translational direction indicated by translation direction vector 242. When alignment guide pins 234 are located within the complementary guide-pin channels, electrical chassis interface 230 of front circuit-breaker panel 204 will be aligned with electrical panel interface 220 of back chassis 202 so that further translation in the direction of translation direction vector 242 will result in consummation of electrical connection between front circuit-breaker panel 204 and back chassis 202.

Mechanical connection of front circuit-breaker panel 204 to back chassis 202 may securely made when the translation in translation direction vector 242 is complete. In some embodiments, an additional locking step can be required subsequent to the translation. In some embodiments the additional locking step is automatically performed by the consummated translation. Such automatic locking may be performed by a spring actuated lock, for example. In some embodiments, the lock may provide audible or tactile feedback to the operator indicating that front circuit-breaker panel 204 has been securely locked to back chassis 202. In the depicted embodiment, mechanical chassis interface 228 of front circuit-breaker panel 204 includes locking release mechanism 244. Locking release mechanism 244 can be actuated before front circuit-breaker panel 204 is translated so as to separate it from back chassis 202. In the depicted embodiment locking release mechanism 244 can be actuated by a user's thumb when holding handles 246 used for pulling front circuit-breaker panel 204 in a direction antiparallel to translation direction vector 242.

Figure 4:
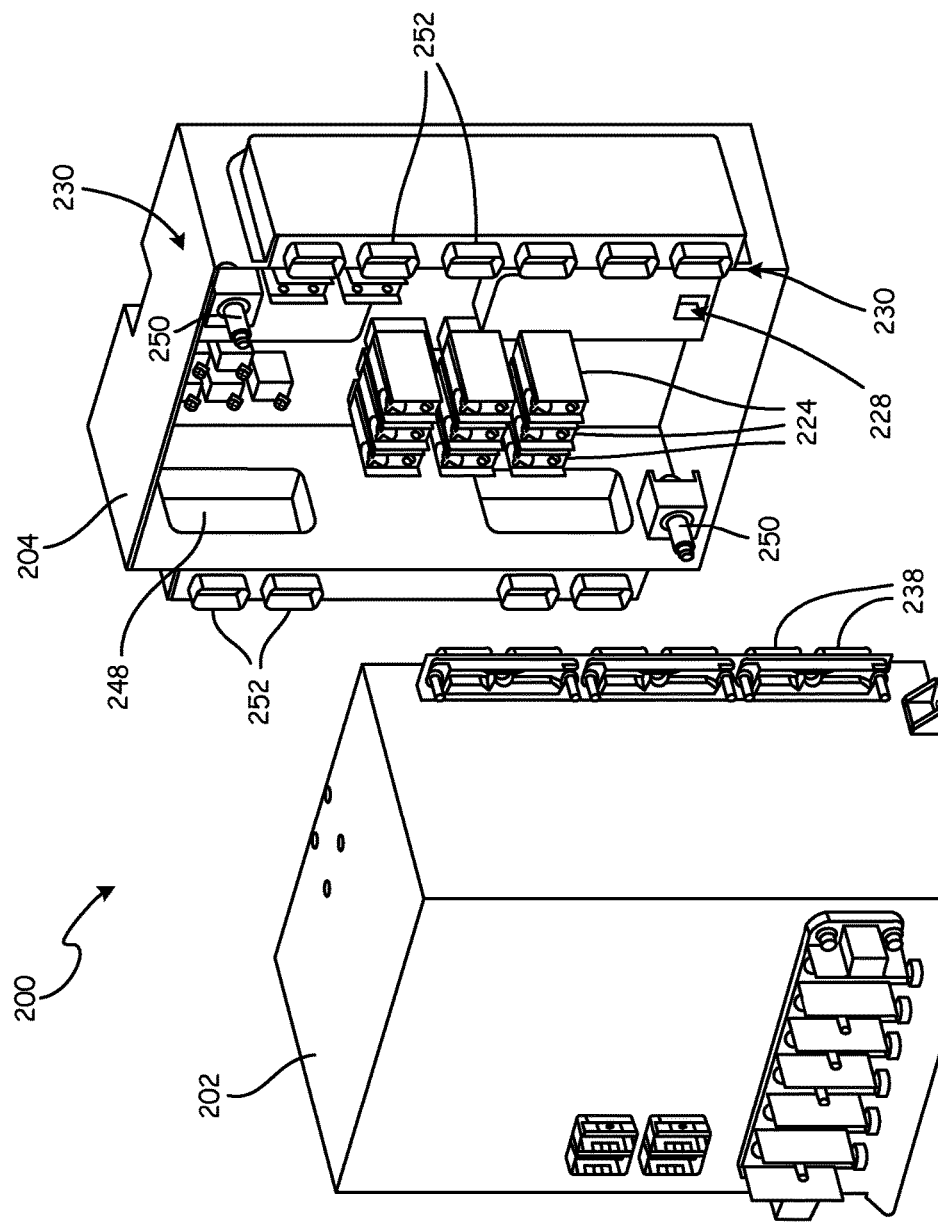
FIG. 4 is a rear perspective view of an exemplary power-distribution system with a front circuit-breaker panel separated from a back chassis.

FIG. 4 is a rear perspective view of an exemplary power-distribution system with a front circuit-breaker panel separated from a back chassis. FIG. 4 depicts the system depicted in FIG. 3, but from the back perspective view. In FIG. 4, front circuit-breaker panel 204 is shown separated from back chassis 202 exposing interior compartment 248. Within interior compartment 248 are a plurality of circuit breakers 224. Intra-compartment wiring is not depicted so as not to obscure the depiction of components within interior compartment 248. In this perspective view, back-chassis interfaces 228, 230 can be seen. Back-chassis interfaces include mechanical chassis interface 228 and electrical chassis interfaces 230. Electrical chassis interface 228 includes a pair of DC bus power pins 250, each corresponding to one of DC bus power pin receivers 236 of back chassis 202. Mechanical interfaces also include guide and latching interfaces for 224 on the front of 204 and connectors 252. Electrical chassis interface 230 includes a plurality of DC distribution connectors 252 and the two power pins of 250. Each of distribution connectors 252 of front circuit-breaker panel 204 is configured to align to and mate with one of distribution connectors 238 of back chassis 202. All electrical connections between front circuit-breaker panel 204 and back chassis 202 are made via distribution connectors 238, 252 and DC bus power pins 250 and DC power pin receivers 236. Using such connectors for all electrical connections facilitates the complete mechanical separation of front circuit-breaker panel 204 and back chassis 202. Complete mechanical separation between a front circuit-breaker panel 204 and a back chassis 202 can have one or more advantages over an interface that doesn't permit complete mechanical separation. Should a wired interface be used for electrical connection between front circuit-breaker panel 204 and back chassis 202, front circuit-breaker panel 204 would remain tethered to back chassis 202 by such a wired interface. Such a wired interface can chafe against front circuit-breaker panel 204, back chassis 202 or joining components such as a hinge contained therein during coupling and uncoupling operations. Furthermore, such tethering can prevent the full exposure of interior compartments 232, 248 as front circuit-breaker panel 204 and rear chassis 202 would remain in close proximity to one another via the tether. A wire bundle can present a partially rigid interface with respect to twisting and flexing of the wire bundle, presenting unknown stress on the wire bundle. In some embodiments, separation distance and separation attitude can be constrained by a wire bundle.

Figure 5:
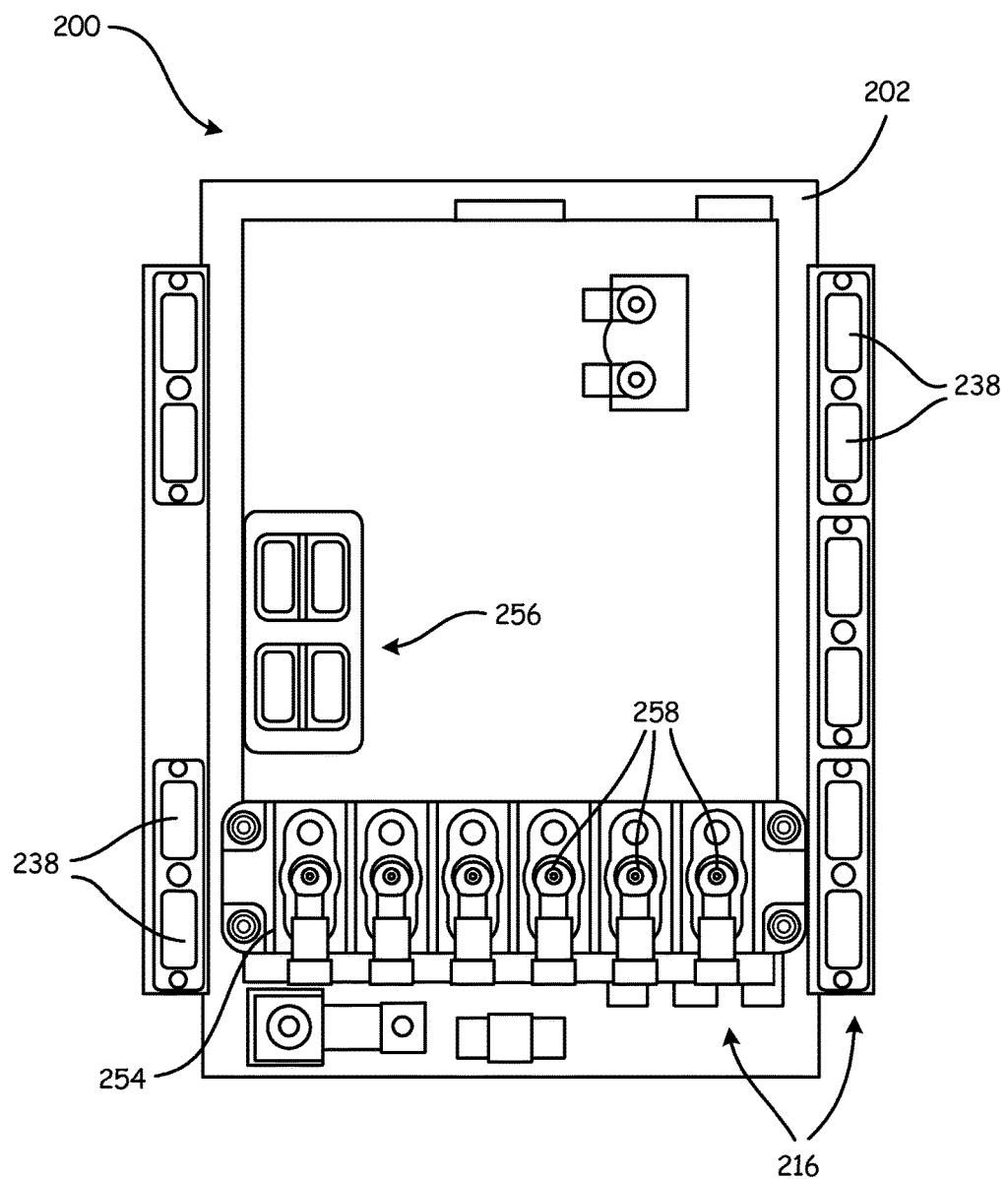
FIG. 5 is a rear side elevation view of a back chassis showing an exemplary connector configuration for electrical connectivity to an aircraft's wiring harness.

FIG. 5 is a rear side elevation view of a back chassis showing an exemplary connector configuration for electrical connectivity to an aircraft's wiring harness. In FIG. 5, back chassis 202 depicted in FIGS. 2-4 is shown from the rear side elevation view. Power-distribution system 200 includes electrical aircraft interface 216. Electrical aircraft interface 216 includes terminal block interface 254, distribution connectors 238 and control and sense interface 256. Terminal block interface 254 is configured to provide electrical connection to one or more electrical wires of the supply power bus of an aircraft. The depicted embodiment shows six different wire connecting interfaces 258 of the terminal block interface 254. Distribution connectors 238 are configured to provide electrical connection from back chassis 202 and a power-distribution harness of an aircraft. The depicted embodiment shows four separate multi-conductor connectors on a left lateral side and six separate multi-conductor connectors on a right lateral side of back chassis 202.

Control and sense interface 256 is configured to provide electrical connection to a control and sense wiring harness. Various control and sense signals may be provided to and/or provided by the back chassis 202. For example, internal voltage sense resistors may provide signals indicating voltages of the supply power bus wires. The auxiliary contacts in contactors 210 or circuit breakers 224 may provide signals indicating the status of primary high-current contactors 210 and/or circuit breakers 224, for example.

Figure 6:
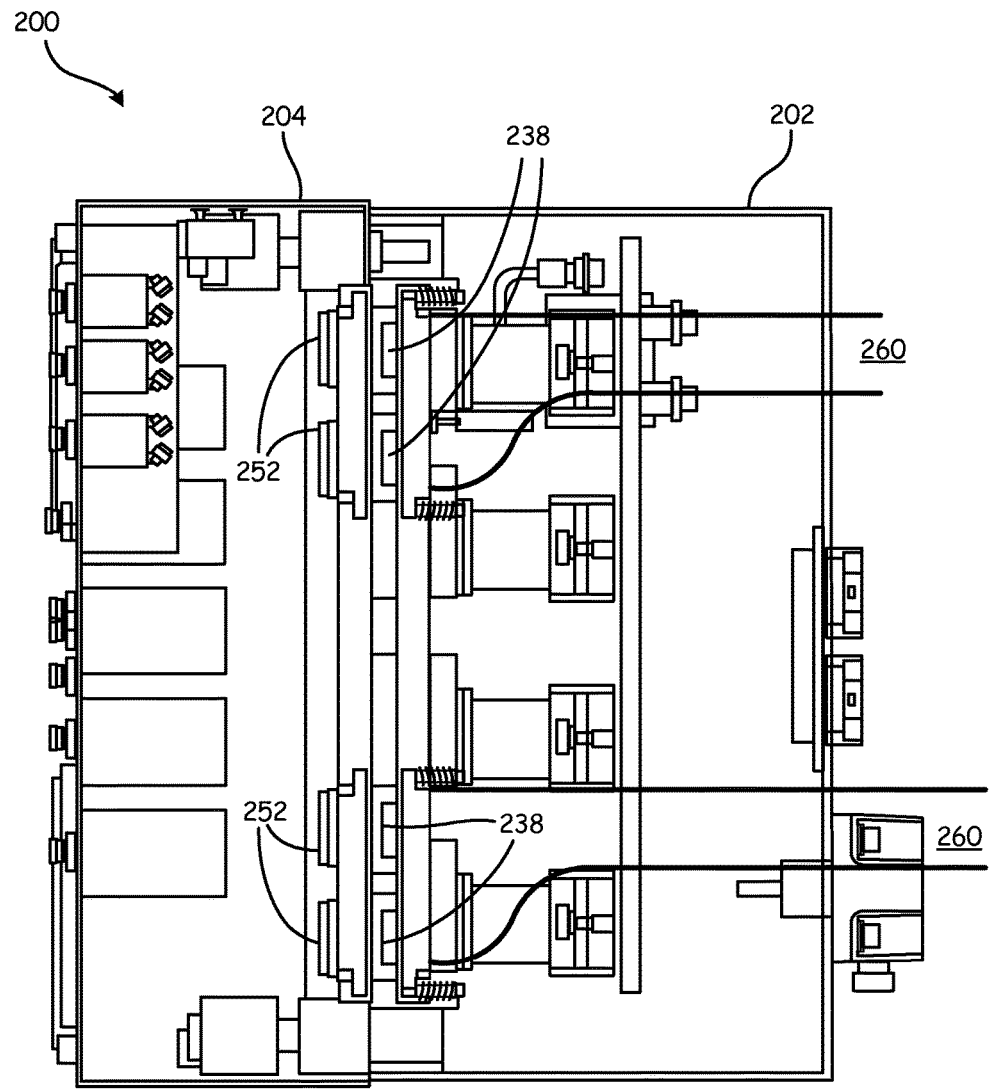
FIG. 6 is a side elevation view of a power-distribution system showing an exemplary connection to a power-distribution harness.

FIG. 6 is a side elevation view of a power-distribution system showing an exemplary connection to a power-distribution harness. In FIG. 6 power-distribution system 200 of FIGS. 2-5 is depicted from a side elevation view. Power-distribution system 200 includes back chassis 202 and front circuit-breaker panel 204. Front circuit-breaker panel 204 is shown connected to back chassis 202. Attached to back chassis 202 are two wiring bundles 260. Wiring bundles 260 can source power through circuit breakers 224 via distribution connectors 238, 252 mated together. Such wiring bundles may then carry such provided power to various electrical circuits and systems of the aircraft.

Figure 7:
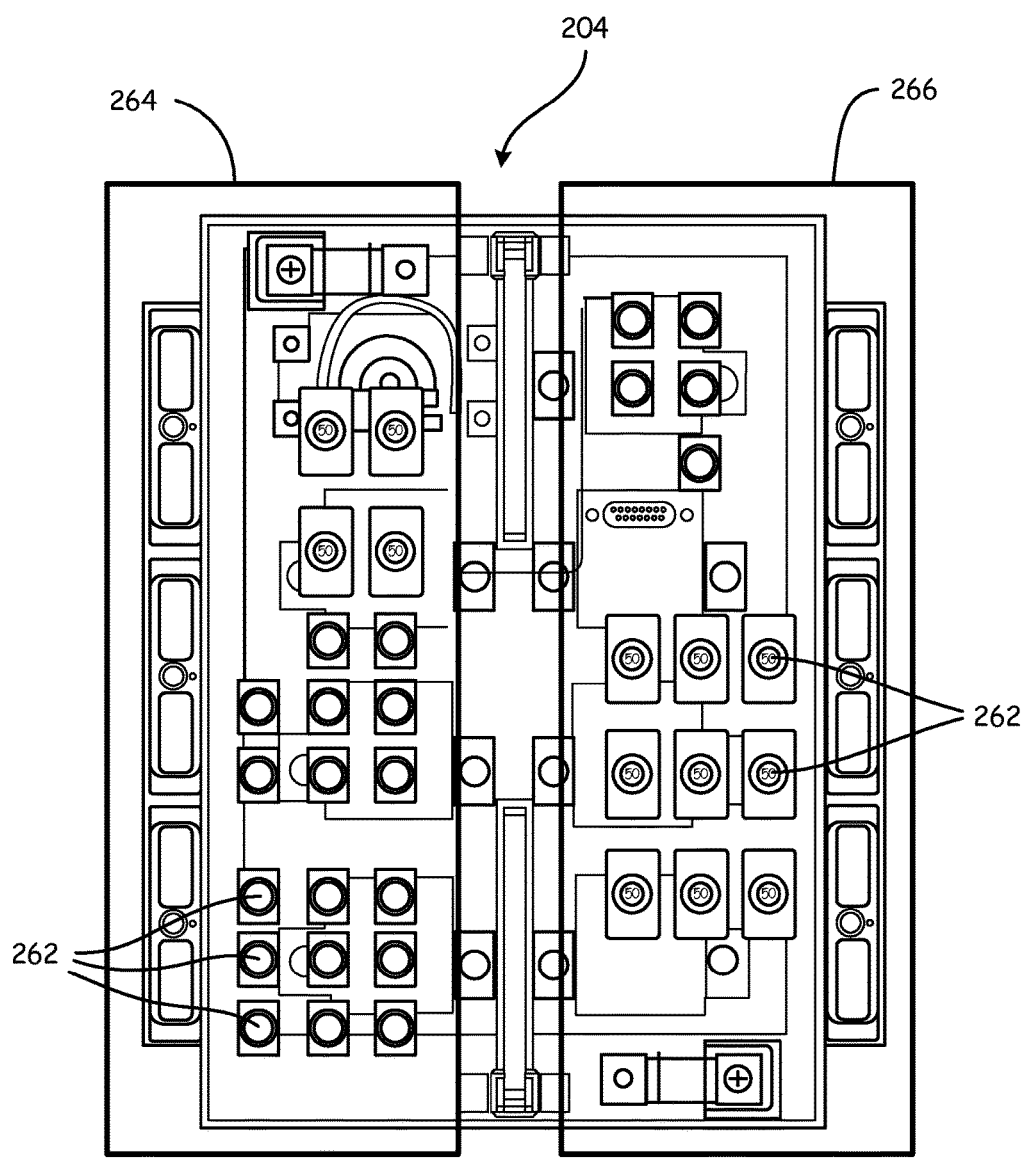
FIG. 7 is a front side elevation view of a front circuit-breaker panel showing an exemplary configuration of circuit breakers.

FIG. 7 is a front side elevation view of a front circuit-breaker panel showing an exemplary configuration of circuit breakers 224. In FIG. 7, front circuit-breaker panel 204 depicted in FIGS. 2-6 is shown from a front elevation view. Front circuit-breaker panel 204 includes a plurality of reset mechanisms 262 each of which are operable by a user to reset a corresponding one of the plurality of circuit breakers 224. Circuit breakers 224 are arranged in two separate groups, first group 264 located in a left half of internal cavity 248 of front circuit-breaker panel 204, and second group 266 located in a right half of internal cavity 248 of front circuit-breaker panel 204. First group 264 may source power to essential aircraft systems and/or circuits. Second group 266 may source power to non-essential aircraft systems and/or circuits, for example. Power to first group 264 may be sourced by one of two DC power bus pins 250. Power to second group 266 may be sourced by the other of two DC power bus pins 250. Each of DC power bus pins 250 may be separately controllable by an external or an internal power controller, for example.

Figure 8:
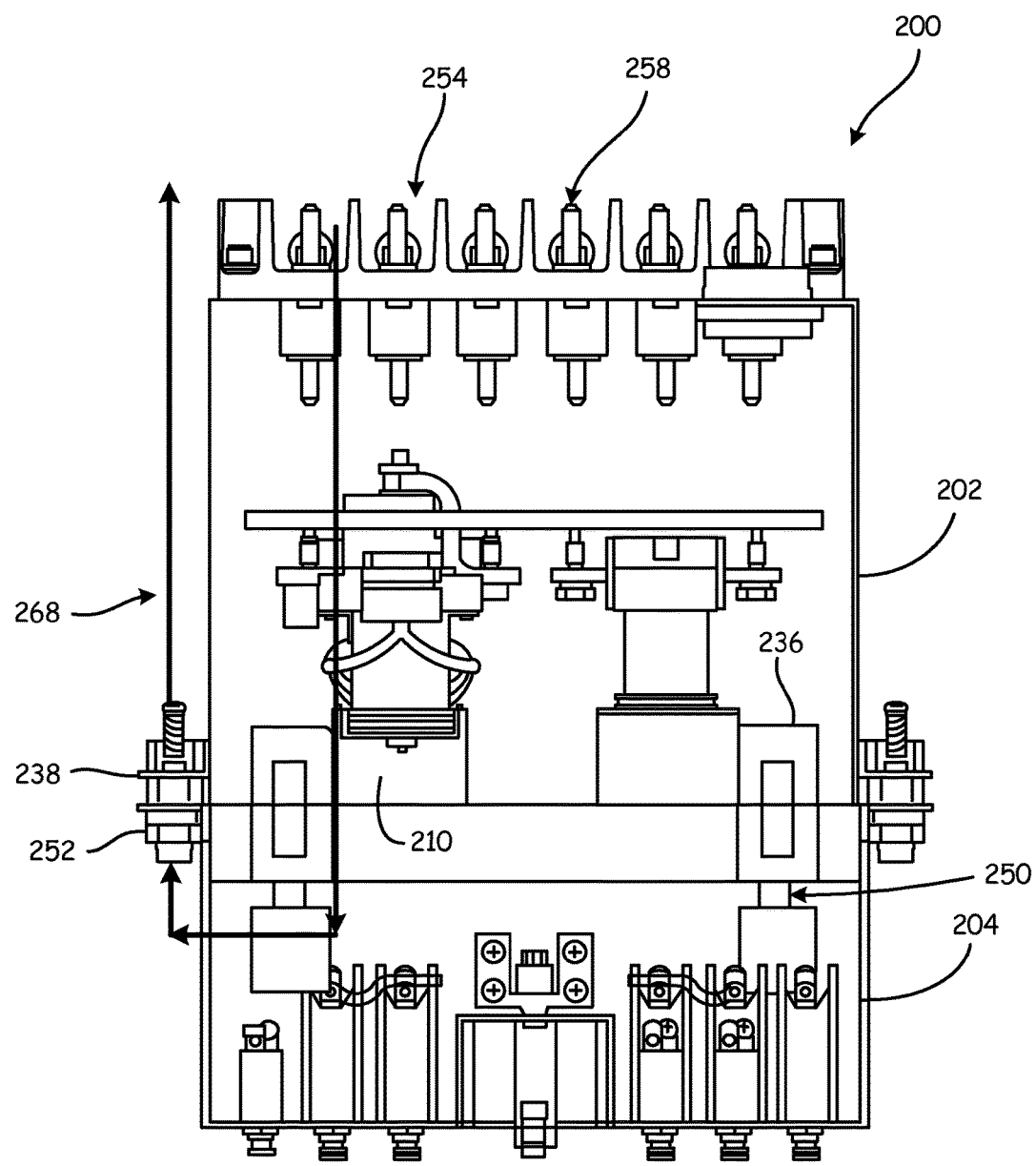
FIG. 8 is a top plan view of a power-distribution system showing an exemplary power flow therethrough.

FIG. 8 is a top plan view of a power-distribution system showing an exemplary power flow therethrough. In FIG. 8, power-distribution system 200 depicted in FIGS. 2-7 is shown from a top plan view. Power-distribution system 200 includes back chassis 202 and front circuit-breaker panel 204 connected to one another. Also depicted is a series of arrows 268 indicating power flow from terminal block 254 through primary high-current contactor 210 through DC bus power pin receiver 236 and corresponding DC bus power pin 250, through circuit breaker 224, through distribution connectors 252, 238 and to the wiring bundles 260. All connectors except distribution connectors 250, 252 are permanent or semi-permanent connectors. Distribution connectors 250, 252 are the only dynamic connection in the system, thereby providing a reliable power path.

Figure 9:
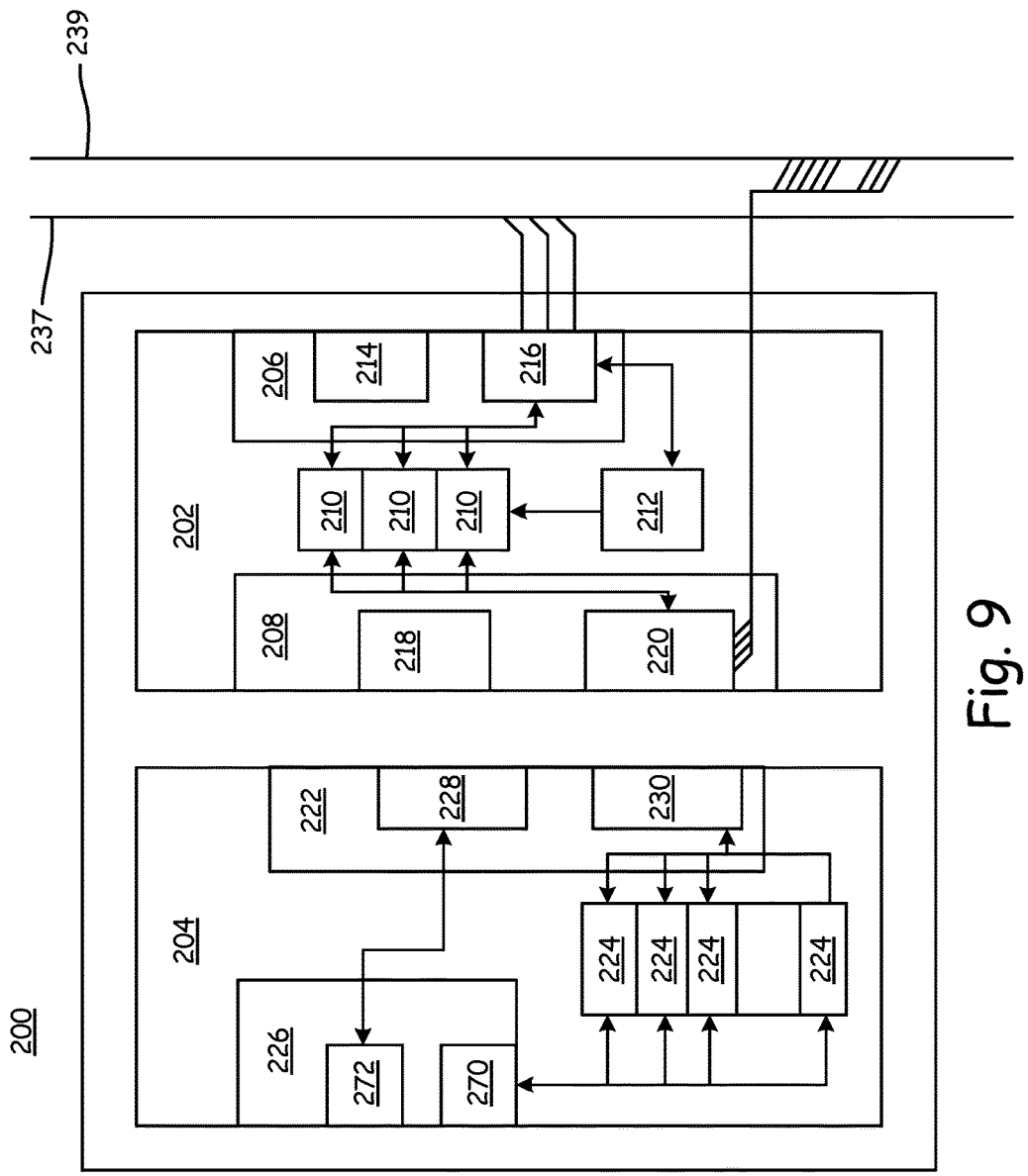
FIG. 9 is a schematic block diagram of an exemplary power-distribution system for providing electrical connectivity to an aircraft's wiring harness.

FIG. 9 is a schematic block diagram of an exemplary power-distribution system for providing electrical connectivity to an aircraft's wiring harness. In FIG. 9, exemplary power-distribution system 200 includes back chassis 202 and front circuit-breaker panel 204. Back chassis 202 includes aircraft interface 206 and front-panel interface 208. Back chassis 202 further includes primary high-current contactors 210 and power terminal block bus interface 212. Aircraft interface 206 includes mechanical aircraft interface 214 and electrical aircraft interface 216. Front-panel interface 208 includes mechanical panel interface 218 and electrical panel interface 230. Front circuit-breaker panel 204 has back-chassis interface 222, plurality of circuit breakers 224 and user interface 226. Back-chassis interface 222 includes mechanical interfaces 228 and 218 and electrical chassis interface 230. User interface 226 includes circuit breaker reset interface 270 and mechanical interface 262. Mechanical interface 262 can include a user operable mechanisms that lock and/or unlock the front circuit-breaker panel 204 from the back chassis 202, for example. Mechanical interface 262 can be mechanically coupled to mechanical chassis interface 220. Electrical aircraft interface 216 connects with both supply power bus 237 and power-distribution harness 239 of an aircraft. Supply power bus 237 can include one or more electrical wires that carry power source by one or more electrical generators and/or converters. Power-distribution harness 239 includes a plurality of electrical wires that provide power to electrical systems and circuits on the aircraft.

In an illustrative embodiment, a power-distribution panel includes a front circuit-breaker panel that has a number of circuit breakers. The power-distribution panel has a back chassis that includes an aircraft interface configured to mechanically couple to an aircraft and configured to electrically couple to both a power-supply bus and a power-distribution harness of the aircraft. The back chassis includes a front-panel interface configured to receive and secure to the front circuit-breaker panel. The front circuit-breaker panel and the back chassis are configured to be secured together such that each of the plurality of circuit breakers is in electrical communication with the power-distribution harness in a first configuration state. The front circuit-breaker panel and the back chassis are configured to be separated from one another such that the front circuit-breaker panel is electrically isolated from the power-distribution harness and from the power-supply bus in a second configuration state.

A further embodiment of the foregoing power-distribution panel, wherein the back chassis can further include one or more primary high-current contactors configured to provide interruptible electrical communication between the aircraft interface and the front-panel interface. A further embodiment of any of the foregoing fan drive gear systems, wherein the back chassis can further include a control interface to which a controller provides power-interruption control of the one or more primary high-current contactors based on sensed operating conditions. A further embodiment of any of the foregoing fan drive gear systems, wherein each of the plurality of circuit breakers can include a reset mechanism that is operable, in the second configuration state, by a user. A further embodiment of any of the foregoing fan drive gear systems, wherein the back chassis can further include one or more supply connections configured to supply power from the power-supply bus to the front circuit-breaker panel, in the second configuration state. A further embodiment of any of the foregoing fan drive gear systems, wherein the front circuit-breaker panel can further include a one or more supply connectors configured to electrically engage with the one or more supply connectors of the back chassis, in the second configuration state. A further embodiment of any of the foregoing fan drive gear systems, wherein the back chassis can further include a plurality of distribution connectors that are configured to supply power from the plurality of circuit breakers to the power-distribution harness. A further embodiment of any of the foregoing fan drive gear systems, wherein the front circuit-breaker panel can further include a plurality of distribution connectors that are configured to electrically engage the plurality of distribution connectors of the back chassis when the front circuit-breaker panel is received by and secured to the back chassis. A further embodiment of any of the foregoing fan drive gear systems, wherein the front-panel interface can be configured to receive and secure to the front circuit-breaker panel without the use of tools. A further embodiment of any of the foregoing fan drive gear systems, wherein, in the second configuration state, the front circuit-breaker panel can be in complete mechanical separation from the back chassis. A further embodiment of any of the foregoing fan drive gear systems, wherein, in the second configuration state, the front circuit-breaker panel can be in complete mechanical separation from the aircraft.

In an illustrative embodiment, a power-distribution panel includes a back chassis configured to be mechanically mounted to an aircraft. The back chassis includes an aircraft interface configured to receive power from one or more power-supply lines, and to provide operating power to a plurality of power-distribution lines. The back chassis includes a front-panel interface configured to receive a front circuit-breaker panel. The front-panel interface has one or more supply-power connectors and a plurality of distribution-power connectors. The back chassis includes a plurality of primary high-current contactors configured to provide interruptible electrical communication of the operating power between the aircraft interface and the front-panel interface. The back chassis also includes a control interface to which a controller provides power-interruption control of the one or more primary high-current contactors based on sensed operating conditions. The front circuit-breaker panel includes a back-chassis interface having one or more supply-power connectors configured to electrically engage the one or more supply-power connectors of the front-panel interface. The back-chassis interface has a plurality of distribution-power connectors configured to electrically engage the plurality of distribution-power connectors of the front-panel interface. The front circuit-breaker panel includes a plurality of circuit breakers each having an input port electrically coupled to receive power supplied through the one or more supply-power connectors. Each of the plurality of circuit breakers has an output port electrically coupled to supply power through a distribution-power connector. The front circuit-breaker panel is configured to removably couple to the back chassis.

A further embodiment of the foregoing power-distribution panel, wherein each of the plurality of circuit breakers includes a reset mechanism that is operable when the front circuit-breaker panel is coupled to the back chassis. A further embodiment of any of the foregoing fan drive gear systems, wherein the front circuit-breaker panel can be further configured to slideably couple to the back chassis. A further embodiment of any of the foregoing fan drive gear systems, wherein the front circuit-breaker panel can be further configured to removably couple to the back chassis without the use of tools. A further embodiment of any of the foregoing fan drive gear systems, wherein, in the second configuration state, the front circuit-breaker panel can be in complete mechanical separation from the back chassis. A further embodiment of any of the foregoing fan drive gear systems, wherein in the second configuration state, the front circuit-breaker panel can be in complete mechanical separation from the aircraft.

In an illustrative embodiment, a method of distributing power within an aircraft includes the step of mechanically mounting a back chassis to an aircraft. The back chassis includes an aircraft interface configured to receive power from one or more power-supply lines. The aircraft interface is configured to provide operating power to a plurality of power-distribution lines. The back chassis includes a front-panel interface configured to receive a front circuit-breaker panel, the front-panel interface having one or more supply-power connectors and a plurality of distribution-power connectors. The back chassis includes a plurality of primary high-current contactors configured to provide interruptible electrical communication of the operating power between the aircraft interface and the front-panel interface. The back chassis also includes a control interface to which a controller provides power-interruption control of the one or more primary high-current contactors based on sensed operating conditions. The method includes the step of removably coupling the front circuit-breaker panel to a back panel. The front panel includes a back-chassis interface having one or more supply-power connectors configured to electrically connect to the one or more supply-power connectors of the front-panel interface. The back-chassis interface has a plurality of distribution-power connectors configured to electrically connect to the plurality of distribution-power connectors of the front-panel interface. The front panel includes a plurality of circuit breakers each having an input port electrically coupled to receive power supplied through a supply-power connector. Each of the plurality of circuit breakers has an output port electrically coupled to supply power through a distribution-power connector.

The method of the preceding paragraph can optionally include, additionally and/or alternatively, the step of presenting a reset mechanism associated with each of the plurality of circuit breakers. The reset mechanism can be operable when the front circuit-breaker panel is coupled to the back chassis. A further embodiment of any of the foregoing methods, wherein removably coupling the front circuit-breaker panel to the back panel can further include being toolessly performed. A further embodiment of any of the foregoing methods, wherein removably coupling the front circuit-breaker panel to the back panel can further include being slideably performed.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A power-distribution panel comprising:
   a front circuit-breaker panel comprising a plurality of circuit breakers; and
   a back chassis comprising:
      an aircraft interface configured to mechanically couple to an aircraft and configured to electrically couple to both a power-supply bus and a power-distribution harness of the aircraft;
      a front-panel interface configured to receive and secure to the front circuit-breaker panel; and
      one or more primary high-current contactors configured to provide interruptible electrical communication between the aircraft interface and the front-panel interface,
   wherein the front circuit-breaker panel and the back chassis are configured to be secured together such that each of the plurality of circuit breakers is in electrical communication with the power-distribution harness in a first configuration state, and
   wherein the front circuit-breaker panel and the back chassis are configured to be separated from one another such that the front circuit-breaker panel is electrically isolated from the power-distribution harness and from the power-supply bus in a second configuration state.

2. The power-distribution panel of claim 1, wherein the back chassis further comprises a control interface to which a controller provides power-interruption control of the one or more primary high-current contactors based on sensed operating conditions.

3. The power-distribution panel of claim 1, wherein each of the plurality of circuit breakers includes a reset mechanism that is operable, in the second configuration state, by a user.

4. The power-distribution panel of claim 1, wherein the back chassis further comprises one or more first supply connectors configured to supply power from the power-supply bus to the front circuit-breaker panel, in the first configuration state.

5. The power-distribution panel of claim 4, wherein the front circuit-breaker panel further comprises one or more second supply connectors configured to electrically engage with the one or more first supply connectors of the back chassis, in the first configuration state.

6. The power-distribution panel of claim 1, wherein the back chassis further comprises a first plurality of distribution connectors that are configured to supply power from the plurality of circuit breakers to the power-distribution harness.

7. The power-distribution panel of claim 6, wherein the front circuit-breaker panel further comprises a second plurality of distribution connectors that are configured to electrically engage the first plurality of distribution connectors of the back chassis when the front circuit-breaker panel is received by and secured to the back chassis.

8. The power-distribution panel of claim 1, wherein the front-panel interface is configured to receive and secure to the front circuit-breaker panel without the use of tools.

9. The power-distribution panel of claim 1, wherein, in the second configuration state, the front circuit-breaker panel is in complete mechanical separation from the back chassis.

10. The power-distribution panel of claim 1, wherein, in the second configuration state, the front circuit-breaker panel is in complete mechanical separation from the aircraft.

11. A power-distribution panel comprising:
   a back chassis configured to be mechanically mounted to an aircraft, the back chassis comprising:
      an aircraft interface configured to receive power from one or more power-supply lines, and to provide operating power to a plurality of power-distribution lines;
      a front-panel interface configured to receive a front circuit-breaker panel, the front-panel interface having one or more first supply-power connectors and a first plurality of distribution-power connectors;
      a plurality of primary high-current contactors configured to provide interruptible electrical communication of the operating power between the aircraft interface and the front-panel interface; and
      a control interface to which a controller provides power-interruption control of the one or more primary high-current contactors based on sensed operating conditions,
   wherein the front circuit-breaker panel comprises:
      a back-chassis interface having one or more second supply-power connectors configured to electrically engage the one or more first supply-power connectors of the front-panel interface, the back-chassis interface having a second plurality of distribution-power connectors configured to electrically engage the first plurality of distribution-power connectors of the front-panel interface; and
      a plurality of circuit breakers each having an input port electrically coupled to receive power supplied through the one or more second supply-power connectors, each of the plurality of circuit breakers having an output port electrically coupled to supply power through a distribution-power connector of the second plurality of distribution-power connectors, and wherein the front circuit-breaker panel is configured to removably couple to the back chassis,
   wherein the front circuit-breaker panel and the back chassis are configured to be secured together such that each of the plurality of circuit breakers is in electrical communication with the plurality of power-distribution lines in a first configuration state, and wherein the front circuit-breaker panel and the back chassis are configured to be separated from one another such that the front circuit-breaker panel is electrically isolated from the plurality of power-supply lines and from the plurality of power-distribution lines in a second configuration state.

12. The power-distribution panel of claim 11, wherein each of the plurality of circuit breakers includes a reset mechanism that is operable when the front circuit-breaker panel is coupled to the back chassis.

13. The power-distribution panel of claim 11, wherein the front circuit-breaker panel is further configured to slideably couple to the back chassis.

14. The power-distribution panel of claim 11, wherein the front circuit-breaker panel is further configured to removably couple to the back chassis without the use of tools.

15. The power-distribution panel of claim 11, wherein, in the first configuration state, the front circuit-breaker panel is in complete mechanical separation from the back chassis.

16. The power-distribution panel of claim 11, wherein, in the first configuration state, the front circuit-breaker panel is in complete mechanical separation from the aircraft.

17. A method of distributing power within an aircraft, the method comprising the steps of:
mechanically mounting a back chassis to an aircraft, the back chassis comprising:
an aircraft interface configured to receive power from one or more power-supply lines, the aircraft interface configured to provide operating power to a plurality of power-distribution lines;
a front-panel interface configured to receive a front circuit-breaker panel, the front-panel interface having one or more first supply-power connectors and a first plurality of distribution-power connectors;
a plurality of primary high-current contactors configured to provide interruptible electrical communication of the operating power between the aircraft interface and the front-panel interface; and
a control interface to which a controller provides power-interruption control of the one or more primary high-current contactors based on sensed operating conditions; and removably coupling the front circuit-breaker panel to a back panel, the front panel comprising:
a back-chassis interface having one or more second supply-power connectors configured to electrically connect to the one or more first supply-power connectors of the front-panel interface, the back-chassis interface having a second plurality of distribution-power connectors configured to electrically connect to the first plurality of distribution-power connectors of the front-panel interface; and
a plurality of circuit breakers each having an input port electrically coupled to receive power supplied through a supply-power connector of the one or more second supply-power connectors, each of the plurality of circuit breakers having an output port electrically coupled to supply power through a distribution-power connector of the second plurality of distribution-power connectors.

18. The method of claim 17, further comprising:
presenting a reset mechanism associated with each of the plurality of circuit breakers, the reset mechanism operable when the front circuit-breaker panel is coupled to the back chassis.

19. The method of claim 17, wherein removably coupling the front circuit-breaker panel to the back panel further comprises being toollessly performed.

20. The method of claim 17, wherein removably coupling the front circuit-breaker panel to the back panel further comprises being slideably performed.

* * * * *